US010698629B2

(12) United States Patent
Annamalai et al.

(10) Patent No.: US 10,698,629 B2
(45) Date of Patent: Jun. 30, 2020

(54) SYSTEMS AND METHODS FOR LOCALITY MANAGEMENT

(71) Applicant: Facebook, Inc., Menlo Park, CA (US)

(72) Inventors: Muthukaruppan Annamalai, Redmond, WA (US); Harish Srinivas, Union City, CA (US); Kaushik Ravichandran, Seattle, WA (US); Igor A. Zinkovsky, Redmond, WA (US); Luning Pan, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 49 days.

(21) Appl. No.: 15/824,750

(22) Filed: Nov. 28, 2017

(65) Prior Publication Data

US 2019/0163391 A1     May 30, 2019

(51) Int. Cl.
| | | |
|---|---|---|
| *G06F 11/34* | (2006.01) | |
| *G06F 16/9535* | (2019.01) | |
| *G06F 16/9537* | (2019.01) | |
| *G06F 3/06* | (2006.01) | |
| *G06Q 50/00* | (2012.01) | |
| *H04L 29/08* | (2006.01) | |

(52) U.S. Cl.
CPC ............ *G06F 3/0647* (2013.01); *G06F 3/067* (2013.01); *G06F 3/0611* (2013.01); *G06F 3/0653* (2013.01); *G06F 11/3476* (2013.01); *G06F 16/9535* (2019.01); *G06F 16/9537* (2019.01); *H04L 67/02* (2013.01); *H04L 67/1002* (2013.01); *H04L 67/125* (2013.01); *H04L 67/306* (2013.01); *G06Q 50/01* (2013.01)

(58) Field of Classification Search
None
See application file for complete search history.

(56) References Cited

U.S. PATENT DOCUMENTS

2006/0004957 A1\*   1/2006   Hand, III ............ G06F 12/0866
                                                                711/113
2006/0005074 A1\*   1/2006   Yanai .................... G06F 3/0601
                                                                714/6.32

\* cited by examiner

*Primary Examiner* — Christopher D Birkhimer
(74) *Attorney, Agent, or Firm* — Sheppard Mullin Richter & Hampton LLP

(57) ABSTRACT

Systems, methods, and non-transitory computer readable media are configured to determine a request corresponding to a portion of data. A placement configuration associated with the portion of data can be determined. The placement configuration can belong to a set of placement configurations. A datacenter identified by the placement configuration can be selected. Subsequently, the portion of data can be accessed at the selected datacenter.

19 Claims, 8 Drawing Sheets

SYSTEMS AND METHODS FOR LOCALITY MANAGEMENT

FIELD OF THE INVENTION

The present technology relates to the field of distributed computing systems. More particularly, the present technology relates to techniques for locality management within distributed computing systems.

BACKGROUND

Users often utilize computing devices for a wide variety of purposes. For example, users of a social networking system can use their computing devices to interact with one another, access content, share content, and create content. To allow the users to participate in these activities, the social networking system can store various data to support such functionality. For example, data stored for a given user can include data corresponding to content shown to the user and data corresponding to actions taken by the user in response to the shown content. The data stored for a given user can also include data corresponding to content created by the user and data corresponding to communications of the user with other users.

SUMMARY

Various embodiments of the present disclosure can include systems, methods, and non-transitory computer readable media configured to determine a request corresponding to a portion of data. A placement configuration associated with the portion of data can be determined. The placement configuration can belong to a set of placement configurations. A datacenter identified by the placement configuration can be selected. Subsequently, the portion of data can be accessed at the selected datacenter.

In an embodiment, a different placement configuration can be selected. Subsequently, the portion of data can be migrated.

In an embodiment, the selection of the different placement configuration can be performed in response to a cross-datacenter communication.

In an embodiment, location data can be set to indicate that the different placement configuration is associated with the portion of data.

In an embodiment, the request can be received at a datacenter of multiple geographically distributed datacenters.

In an embodiment, the determining the placement configuration associated with the portion of data can further comprise consulting location data.

In an embodiment, the accessing of the portion of data can be logged to count data.

In an embodiment, the selected datacenter can store a primary instance of the portion of data. Moreover, the accessing the portion of data can comprise writing to the portion of data.

In an embodiment, the selected datacenter can store a secondary instance of the portion of data. Moreover, the accessing the portion of data can comprise reading from the portion of data.

In an embodiment, the set of placement configurations can be changed.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
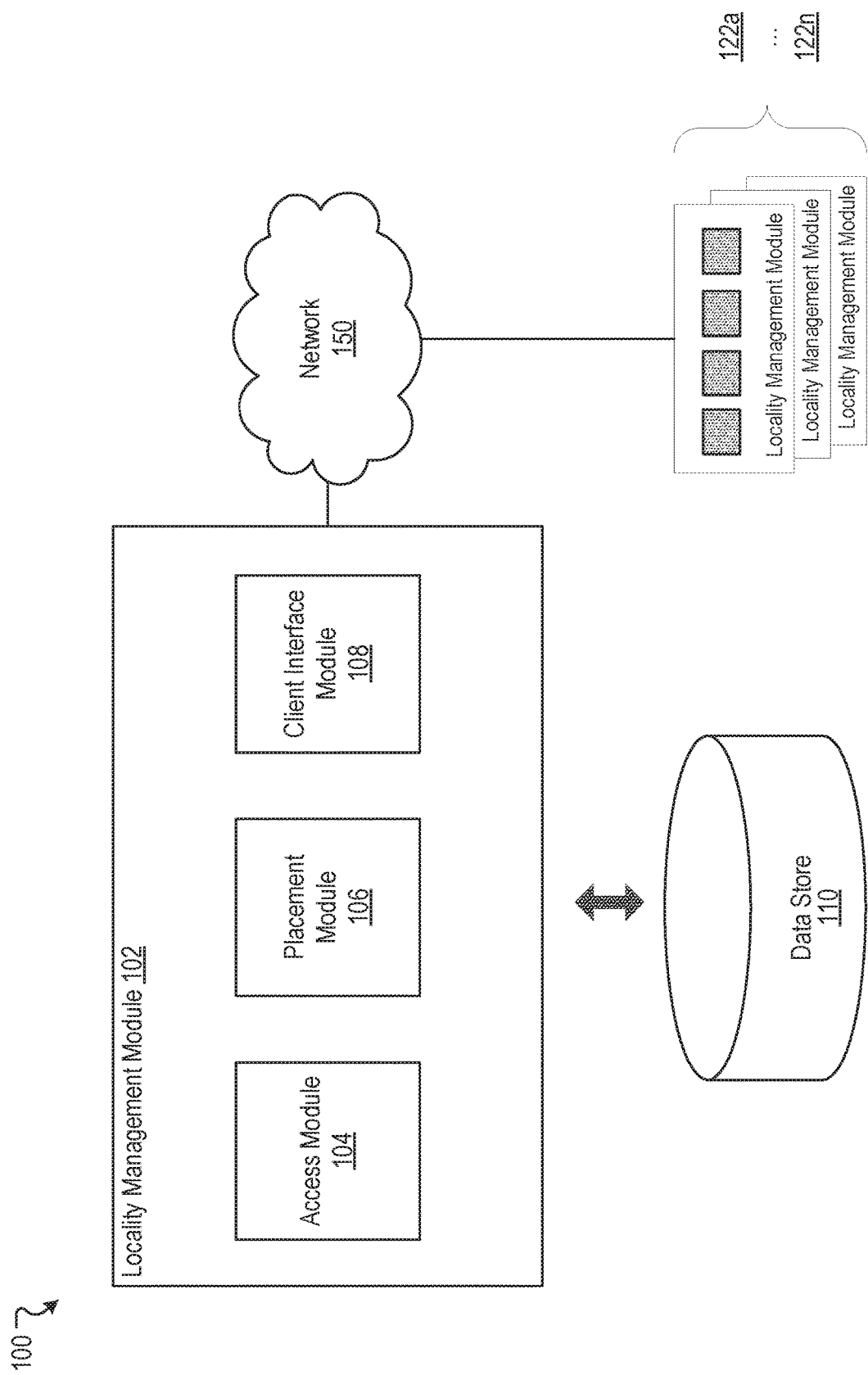
FIG. 1 illustrates an example system including an example locality management module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Locality Management

Users often utilize computing devices for a wide variety of purposes. For example, users of a social networking system can use their computing devices to interact with one another, access content, share content, and create content. To allow the users to participate in these activities, the social networking system can store various data to support such functionality. For example, data stored for a given user can include data corresponding to content shown to the user and data corresponding to actions taken by the user in response to the shown content. The data stored for a given user can also include data corresponding to content created by the user and data corresponding to communications of the user with other users.

A social networking system can have a large number of users. Further, the users can reside in locations over a wide geographical area. Allowing the users low-latency access to their data regardless of their locations can be challenging. Some conventional approaches attempt to answer this challenge by having multiple datacenters located at different geographical locations. Some conventional approaches have the datacenters implement distributed in-memory caches. However, distributed in-memory caches are typically only effective for data accesses which exhibit high read-write ratios. Also, distributed in-memory caches tend to not support strong consistency. Some conventional approaches have each datacenter store a copy of all data for all users.

However, this can lead to excessive storage requirements. Moreover, keeping data synchronized between datacenters can lead to demanding networking requirements. Some conventional approaches attempt to address these issues by assigning each datacenter a particular static subset of user data for storage. Choosing which particular static subset should be stored by a given datacenter can be a difficult task. For example, it can be difficult to predict at which datacenter the data for a given user can be accessed. Such difficulties may arise due to relocation of users among geographical areas. For example, load balancing algorithms can cause a data access for a user to be redirected to a datacenter which is not the nearest datacenter to the user. As a result, conventional approaches can make poor decisions as to which particular static subset of user data should be managed by a given datacenter. Such inaccurate placement decisions can lead to a scenario where a given datacenter receives a request for data that is not being managed (e.g., stored) by the datacenter. Under this circumstance, a cross-datacenter communication is performed in order to reach a datacenter which does manage the requested data. As a result, poor data placement decisions can lead to increased costs resulting from cross-datacenter traffic. Some conventional approaches allow for migration of data among datacenters. However, these approaches tend to migrate data in large chunks and each chunk can include data corresponding to many users. Such migrations can lead to high overhead and slow reaction time for migrations. Certain conventional approaches support migrating data in smaller chunks. However, these approaches tend to not support strong consistency. Also, these approaches tend to approximate data accesses using simple heuristics. The poor data access approximations yielded by these heuristics can lead to problems including ineffective placement of data among datacenters. Due to these or other concerns, conventional approaches can be disadvantageous or problematic. Therefore, an improved approach can be beneficial for addressing or alleviating various drawbacks associated with conventional approaches. Based on computer technology, the disclosed technology can allow for various data (e.g., user data) to be stored and accessed in an effective manner.

An improved approach rooted in computer technology overcomes the foregoing and other disadvantages associated with conventional approaches specifically arising in the realm of computer technology. In various embodiments, a datacenter can receive a request to access a portion of data. The datacenter can include a computing system of a distributed computing system (e.g., a social networking system). The computing system can determine the portion of data to be subject to one of multiple placement configurations. In some embodiments, the placement configuration associated with the portion of data can identify a set of datacenters (e.g., one or more computing systems or servers) of the distributed computing system at which the portion of data is stored and replicated. Subsequently, the computing system can select one of the datacenters from the set of datacenters as the datacenter to use for accessing the portion of data. The computing system can then access the portion of data at the selected datacenter. In some instances, the datacenter through which the portion of data is ultimately accessed may not be the datacenter which received the request to access the portion of data. In such instances, the computing system can determine that a cross-datacenter communication was needed to service the request for the portion of data. When a cross-datacenter communication occurs, the placement configuration being used for the portion of data can be reevaluated. Upon reevaluation, a different placement configuration for the portion of data can be selected. In some embodiments, the portion of data can be migrated to a different set of datacenters based on the different placement configuration. More details regarding the discussed technology are provided herein.

FIG. 1 illustrates an example system 100 including an example locality management module 102, according to an embodiment of the present disclosure. As shown in the example of FIG. 1, the locality management module 102 can include an access module 104, a placement module 106, and a client interface module 108. In some instances, the example system 100 can include at least one data store 110. The components (e.g., modules, elements, etc.) shown in this figure and all figures herein are exemplary only, and other implementations can include additional, fewer, integrated, or different components. Some components may not be shown so as not to obscure relevant details.

In some embodiments, the locality management module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the locality management module 102 can be implemented, in part or in whole, as software running on one or more computing devices or systems. For example, the locality management module 102 or at least a portion thereof can be implemented using one or more computing devices or systems that include one or more servers, such as network servers or cloud servers. In some instances, the locality management module 102 can, in part or in whole, be implemented within or configured to operate in conjunction with a system (or service), such as a social networking system 530 of FIG. 5. In some instances, the locality management module 102 can be, in part or in whole, implemented within or configured to operate in conjunction or be integrated with a client computing device, such as the user device 510 of FIG. 5. For example, the locality management module 102 can be implemented as or within a dedicated application (e.g., app), a program, or an applet running on a user computing device or client computing system. The application incorporating or implementing instructions for performing some, or all, functionality of the locality management module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible. It should be understood that there can be many variations or other possibilities.

The locality management module 102 can be configured to communicate and/or operate with the at least one data store 110, as shown in the example system 100. The at least one data store 110 can be configured to store and maintain various types of data. For example, the data store 110 can store information used or generated by the locality management module 102. The information used or generated by the locality management module 102 can include, for example, data corresponding to a set of placement configurations, portion data, count data, and location data. In some implementations, the at least one data store 110 can store information associated with the social networking system (e.g., the social networking system 530 of FIG. 5). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data.

In various embodiments, the locality management module 102 can operate with respect to data which can be grouped into portions of data. A portion of data can hold some amount of data which represents a subset of a total amount of data being stored. For instance, where data for each of multiple users is being stored, some or all of the data for each user can be stored as its own portion of data. As an illustration, a portion of data can have a size ranging from several kilobytes to several megabytes. A portion of data can be implemented in a number of ways. As one example, where a portion of data is stored in a key-value database, keys of the portion of data can be prefixed with a unique identifier of the portion of data. As another example, implementing a portion of data can include establishing a separate database index for the portion of data. The database index can serve to group data corresponding to the portion of data. In some embodiments, a portion of data can be stored on a database shard. Also, in some embodiments, a portion of data can be a ZippyDB microshard or other microshard, a Spanner directory or other directory, or a logical entity. Many variations are possible.

In some embodiments, the locality management module 102 may be able to access various placement configurations for purposes of storing and replicating portions of data. For example, a placement configuration used for a given portion of data can identify a set of datacenters among which the portion of data can be stored and replicated. In some embodiments, the placement configuration can designate at least one datacenter included in the set of datacenters to be a primary datacenter that stores a primary instance of the portion of data. Further, the placement configuration can also designate one or more different datacenters included in the set of datacenters to be secondary datacenters that store secondary instances of the portion of data. In some embodiments, write operations to the portion of data can be made to the primary instance of the portion of data and later propagated to the secondary instances of the portion of data. In some embodiments, read operations on the portion of data which require strong consistency can be made from the primary instance of the portion of data. As an example, a read of the portion of data requiring strong consistency can require a fully up-to-date version of the portion of data. Read operations not requiring strong consistency can be performed either on the primary instance of the portion of data or from a secondary instance of the portion of data. In some embodiments, a primary instance of a portion of data can be stored on a primary database shard while secondary instances of the portion of data can each be stored on one or more secondary database shards.

As an illustration, a placement configuration can dictate that a primary instance of a portion of data be stored at a first specified datacenter and that there be three secondary instances of the portion of data. The placement configuration can further dictate that one of the secondary instances be replicated to a second specified datacenter and that two of the secondary instances both be replicated to a single third specified datacenter. As another illustration, a placement configuration can dictate that a primary instance of a portion of data be stored at a first specified datacenter and that there be three secondary instances of the portion of data with each secondary instance being replicated by a different datacenter. As an additional illustration, a placement configuration can dictate that a primary instance of a portion of data be stored at a first specified datacenter and a corresponding secondary instance of the portion of data be stored at each datacenter included in a set of datacenters associated with the placement configuration.

In general, a placement configuration can be implemented in a number of ways. As examples, a placement configuration can correspond to a ZippyDB replica set collection or other replica set collection. As further examples, a placement configuration can correspond to a ZippyDB replication configuration or other replication configuration. Many variations are possible.

In some embodiments, there may be multiple geographically distributed datacenters that correspond to a distributed computing system. For example, a first of the datacenters can be managed by the locality management module 102. In this example, other datacenters can be managed by respective locality management modules 122a-122n. As implemented, each of the locality management modules 122a-122n can perform the same, or similar, operations are those discussed in reference to the locality management module 102. In some embodiments, the locality management module 102 and locality management modules 122a-122n can each be implemented as one or more distributed and/or stateless services. In some embodiments, various portions of data can be stored and replicated among the datacenters.

The access module 104 can maintain data describing accesses to (or requests to access) portions of data. The access module 104 can also maintain data corresponding to placement configuration selections. Further still, the access module 104 can maintain data describing migrations. The access module 104 can be used in operations including accessing and migrating portions of data. Additional details regarding the access module 104 are provided below with reference to FIG. 2A.

The placement module 106 can add and remove placement configurations. The placement module 106 can also select placement configurations for portions of data. The placement module 106 can additionally migrate portions of data between datacenters. Additional details regarding the placement module 106 are provided below with reference to FIG. 2B.

The client interface module 108 can select a datacenter to be used for accessing a portion of data. The client interface module 108 can also process a request to access a portion of data. The client interface module 108 can be used when allowing a client application to read from and write to portions of data. Additional details regarding the client interface module 108 are provided below with reference to FIG. 2C.

Figure 2A:
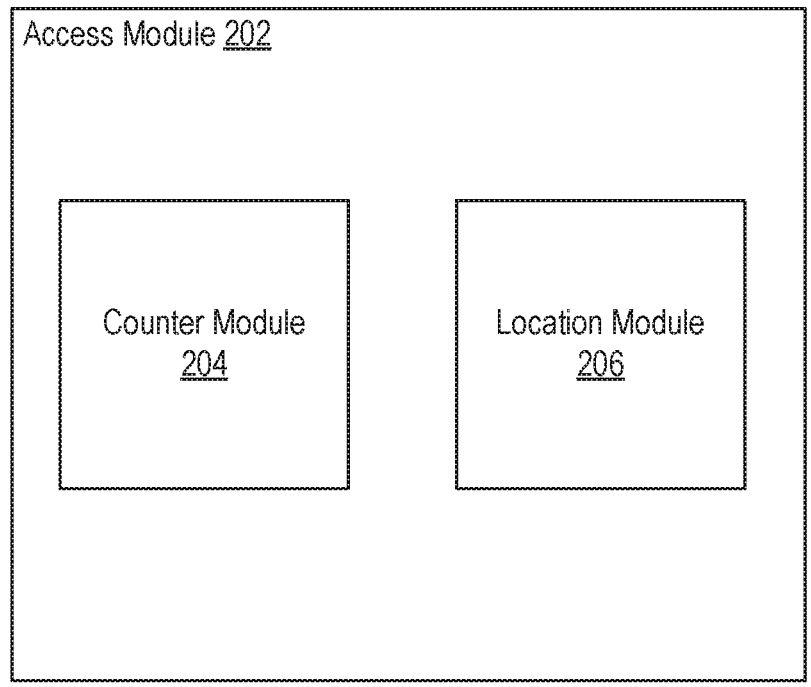
FIG. 2A illustrates an example of an access module, according to an embodiment of the present disclosure.

FIG. 2A illustrates an example access module 202, according to an embodiment of the present disclosure. In some embodiments, the access module 104 of FIG. 1 can be implemented as the example access module 202. As shown in FIG. 2A, the access module 202 can include a counter module 204 and a location module 206.

The counter module 204 can maintain count data. In various embodiments, count data for a given portion of data can indicate a number of accesses to (or number of access requests received for) the portion of data. In some embodiments, for each portion of data, the counter module 204 can record a respective count of a number of times the portion of data was accessed from each datacenter. The count data can be used in various operations. For example, the count data can be used in selecting (or updating) corresponding placement configurations for portions of data, as discussed in greater detail herein.

The location module 206 can maintain data corresponding to placement configuration selections. The data can include information describing respective placement configurations selected for various portions of data.

The location module 206 can also maintain migration data. The migration data can associate portions of data with information describing whether or not the portions of data are currently being migrated. In some embodiments, under-migration locks can be used to describe whether or not the portions of data are currently being migrated. An under-migration lock for a portion of data can be set to "on" when the portion of data is undergoing migration. The under-migration lock for the portion of data can be set to "off" when the portion of data is not undergoing migration. In some embodiments, when the under-migration lock for the portion of data is set to "on," the portion of data can be added to a list of ongoing migrations. In these embodiments, when the under-migration lock for the portion of data is set to "off," the portion of data can be removed from the list of ongoing migrations. The migration data can be used in various operations. For example, the migration data can be used in migrating portions of data, as discussed in reference to FIG. 2B.

Figure 2B:
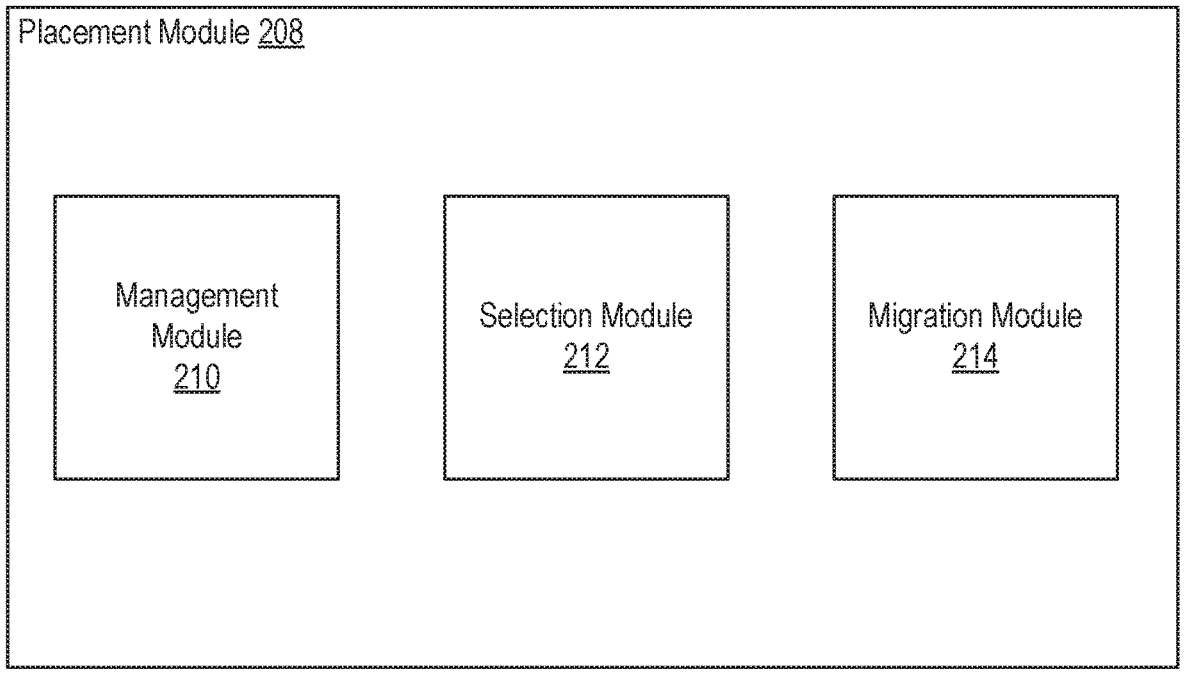
FIG. 2B illustrates an example of a placement module, according to an embodiment of the present disclosure.

FIG. 2B illustrates an example placement module 208, according to an embodiment of the present disclosure. In some embodiments, the placement module 106 of FIG. 1 can be implemented as the placement module 208. As shown in FIG. 2B, the placement module 208 can include a management module 210, a selection module 212, and a migration module 214.

In various embodiments, the management module 210 can manage placement configurations being used to store and replicate portions of data. For example, the management module 210 can add a new placement configuration to a set of available placement configurations. The new placement configuration can identify one or more datacenters to be used when storing and replicating a portion of data according to the placement configuration. Subsequently, the new placement configuration can be available as a candidate placement configuration for storing portions of data. Similarly, the management module 210 can also remove an existing placement configuration from the set of available placement configurations. In some embodiments, a placement configuration that has been removed is no longer considered as a candidate placement configuration for storing portions of data. Further, where one or more portions of data were using the removed placement configuration, different placement configurations can be selected for the portions of data. The process for selecting placement configurations is discussed in greater detail below.

Placement configurations can be updated for various reasons. For example, in some embodiments, the management module 210 can add or remove one or more placement configurations in response to one or more datacenters going offline. As another example, in some embodiments, the management module 210 can add or remove placement configurations in response to one or more datacenters coming online. As an additional example, in some embodiments, the management module 210 can automatically add or remove placement configurations periodically (e.g., weekly, monthly, etc.) to account for changes in network traffic, changes in datacenter hardware availability, and changes to load balancing algorithms, to name some examples.

The selection module 212 can be configured to select (or update) corresponding placement configurations for portions of data. In general, placement configurations can be selected (or updated) based on myriad considerations. As one example, a placement configuration for a portion of data can be selected when the portion of data is first created. As another example, a new placement configuration for a portion of data can be selected (or updated) when an existing placement configuration for the portion of data is removed. As a further example, a new placement configuration can be selected (or updated) for a portion of data when an existing placement configuration for the portion of data is determined to be unsatisfactory. For example, a new placement configuration can be selected when it is determined that a cross-datacenter communication is needed to access the portion of data. A cross-datacenter communication can involve accessing the portion of data from a datacenter other than a datacenter which received a request for the portion of data.

In selecting (or updating) a placement configuration for a portion of data, the selection module 212 can compute a score for each of the available placement configurations. In determining the scores for the placement configurations, the selection module 212 can access count data which has been recorded for the portion of data by the access module 104. As discussed, the count data can describe the number of times each datacenter has accessed the portion of data. Subsequently, the selection module 212 can use the count data to calculate scores for the placement configurations. The scores can serve to quantify how satisfactory each placement configuration is for the portion of data. As one example, a score for a given placement configuration can take into account the number of cross-datacenter communications that would have occurred had that placement configuration been used to manage (e.g., store and/or replicate) the portion of data. The selection module 212 can determine the highest scoring placement configuration to be used for managing the portion of data. Many variations are possible.

The migration module 214 can migrate portions of data. A migration can include moving one or more instances of a portion of data among datacenters. As a first example, a portion of data can be migrated when a new placement configuration is assigned to the portion of data. In this example, the portion of data can be migrated from one or more first datacenters associated with a previously assigned placement configuration to one or more second datacenters associated with the newly assigned placement configuration.

The migration module 214 can use multiple stages to migrate a portion of data. In some embodiments, a first migration stage can involve the migration module 214 checking whether an under-migration lock for the portion of data is set to "on" or "off." As discussed, the location module 206 manages under-migration locks for portions of data. An under-migration lock for a portion of data can be used to indicate whether or not that portion of data is currently being migrated. In some embodiments, when the under-migration lock for the portion of data is set to "on," the migration module 214 does not migrate the portion of data. In some embodiments, when the under-migration lock for the portion of data is set to "off," the migration module 214 sets the under-migration lock to "on," and then migrates the portion of data based on its newly assigned placement configuration.

In some embodiments, a second migration stage can involve restricting the portion of data to be "read-only" at datacenters associated with a previously assigned placement configuration for the portion of data. In some embodiments, restricting the portion of data to be "read-only" can include setting access control list (ACL) permissions that restrict access to instances of the portion of data.

In some embodiments, a third migration stage can involve accessing the portion of data from datacenters associated with a previously assigned placement configuration. In particular, accessing the portion of data can include reading instances of the portion of data from datacenters associated with the previously assigned placement configuration. Information read from the instances of the portion of data can later be written in a subsequent migration stage.

In some embodiments, a fourth migration stage can involve writing information to the portion of data using datacenters associated with the new placement configuration. In particular, writing to the portion of data can include writing to instances of the portion of data at datacenters associated with the new placement configuration. In some embodiments, the information written to the portion of data can be information that was previously read during the third migration stage, as described above. In some embodiments, the fourth migration stage can also involve restricting the portion of data to be "read-only" at datacenters associated with the new placement configuration. In some embodiments, restricting the portion of data to be "read-only" can include setting ACL permissions that restrict access to instances of the portion of data.

As discussed, the location module 206 can maintain information describing respective placement configurations selected for various portions of data. In some embodiments, a fifth migration stage can involve setting this information to indicate that the new placement configuration has been selected for the portion of data. In some embodiments, a sixth migration stage can involve deleting the portion of data using datacenters associated with the old placement configuration. In particular, deleting the portion of data can include deleting instances of the portion of data at datacenters associated with the old placement configuration.

In some embodiments, a seventh migration stage can involve setting the portion of data to be "read-write" at datacenters associated with the new placement indication. In some embodiments, setting the portion of data to "read-write" can include setting ACL permissions that permit read-write access to instances of the portion of data. Finally, in some embodiments, an eighth migration stage can involve setting the under-migration lock for the portion of data to "off."

In some embodiments, strong consistency can be desired for the portion of data. In other embodiments, strong consistency for the portion of data can be considered unnecessary. As an example, strong consistency for the portion of data can include ensuring that writing information to the portion of data during the migration of the portion of data does not result in loss of the information. Many variations are possible. Where strong consistency is desired for the portion of data, certain of the migration stages can be performed atomically and/or via a transaction. Performing a migration stage atomically and/or via a transaction can cause the actions which make up the migration stage to be performed without interruption. In some embodiments, the first, the fourth, and the eighth migration stages can be performed atomically and/or via a transaction when strong consistency is desired.

As a second example, a portion of data can be migrated when the portion of data is first created. In these embodiments, migrating the portion of data can involve reading information from a source, such as a temporary storage location. The information can be specified by a request received at a datacenter. Migrating the portion of data can further involve writing the information to the portion of data using datacenters associated with a placement configuration selected for the portion of data. In particular, writing to the portion of data can include writing to instances of the portion of data associated with the placement configuration. Migrating the portion of data can also include deleting the data from the source.

Figure 2C:
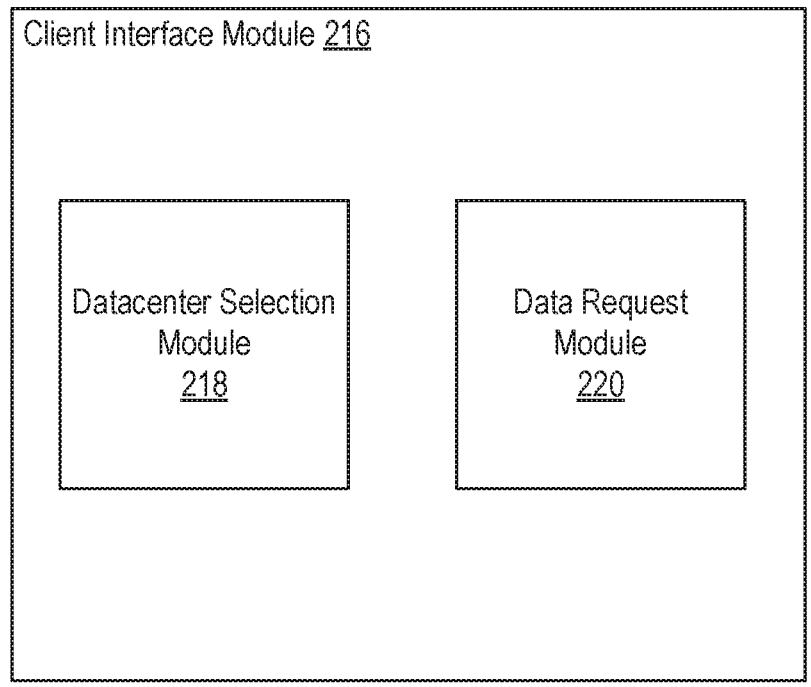
FIG. 2C illustrates an example of a client interface module, according to an embodiment of the present disclosure.

FIG. 2C illustrates an example client interface module 216, according to an embodiment of the present disclosure. In some embodiments, the client interface module 108 of FIG. 1 can be implemented as the example client interface module 216. As shown in FIG. 2C, the client interface module 216 can include a datacenter selection module 218 and a data request module 220.

The datacenter selection module 218 can be configured to select a given datacenter from datacenters associated with a placement configuration. In some embodiments, the datacenter selection module 218 can select an appropriate datacenter when a request to access a portion of data is received. In some embodiments, the datacenter selection module 218 can select a datacenter that is within a threshold geographic distance of a datacenter which received the request. The datacenter selection module 218 can select the datacenter that is within the threshold geographic distance of the datacenter which received the request for a number of reasons. One of these reasons can be the access to the portion of data being a read which does not require strong consistency. A read not requiring strong consistency can be a read which does not require up-to-date data. In some embodiments, when access to the portion of data is requested, the datacenter selection module 218 can select a datacenter that manages a primary instance of the portion of data. As one example, the datacenter selection module 218 can select a datacenter that manages a primary instance of the portion of data when the access to the portion of data is to be a read requiring strong consistency. A read requiring strong consistency can be a read which requires up-to-date data. As another example, the datacenter selection module 218 can select the datacenter that manages a primary instance of the portion of data when the access to the portion of data is to be a write.

The data request module 220 can process requests to access portions of data. In some embodiments, such requests can be received from client software applications running on computing devices. As an example, a client application can read from and write to portions of data which correspond to users of the social networking system. As an illustration, the client application can read from and write to these portions of data in conjunction with keeping track of content items shown to the users.

The data request module 220 can determine which placement configuration has been selected for the portion of data. As discussed, the placement configuration can identify a set of datacenters among which the portion of data can be stored and replicated. In some embodiments, when processing a request to access the portion of data, the data request module 220 can use the datacenter selection module 218 to select a datacenter from the set of datacenters associated with the selected placement configuration. The selected datacenter may, but need not, be the datacenter in which the data request module 220 is implemented. In some embodiments, the data request module 220 can access an instance of the portion of data which is stored at the selected datacenter. In some embodiments, when the request corresponds to a read request, the data request module 220 can provide the computing device from which the request was received with information that is responsive to the read request. In some embodiments, when the selected datacenter is not the datacenter at which the data request module 220 is implemented, the selection module 212 can determine that a cross-datacenter communication has occurred. In such instances, the selection module 212 can update the placement configuration for the portion of data as described above.

Figure 3:
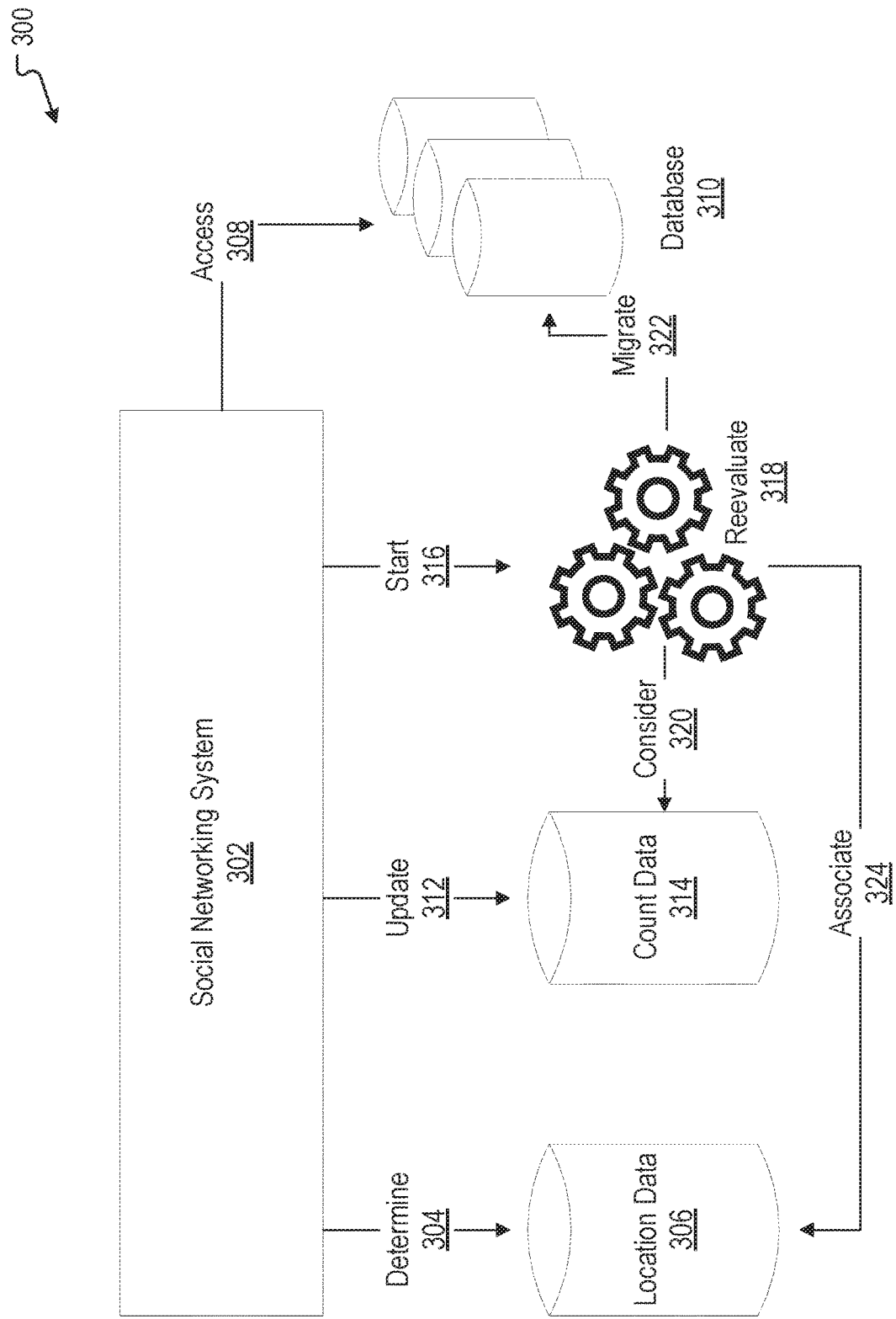
FIG. 3 illustrates an example functional block diagram, according to an embodiment of the present disclosure.

FIG. 3 illustrates an example functional block diagram 300, according to an embodiment of the present disclosure. The example functional block diagram 300 illustrates managing data, such as user data associated with a social networking system, in accordance with various embodiments. In various embodiments, data associated with a social networking system 302 can be managed as portions of data. In some embodiments, a request to access a given portion of data can be received by the social networking system 302. The request can be sent by a client application running on a computing device.

In some embodiments, the social networking system 302 can manage (e.g., store and/or replicate) portions of data using multiple geographically distributed datacenters. In some embodiments, any of these distributed datacenters can receive and process requests relating to portions of data.

In some embodiments, the social networking system 302 can determine 304 a placement configuration that was selected for the portion of data, for example, based on location data 306. The placement configuration can identify a set of datacenters among which the portion of data can be stored and replicated. Subsequently, the social networking system 302 can select a datacenter from the set of datacenters. As one example, the selected datacenter can be a datacenter that is within a threshold geographic distance of a datacenter which received the request. The selected datacenter can be a different datacenter from the datacenter which received the request.

Subsequently, the social networking system 302 can access 308 the portion of data at the selected datacenter. In some embodiments, accessing the portion of data at the selected datacenter can include accessing a database 310. Further, the social networking system 302 can update 312 count data 314 to reflect the access to the portion of data. For example, the social networking system 302 can increment a count of accesses to (or requests to access) the portion of data. In some embodiments, the social networking system 302 can determine a cross-datacenter communication to have occurred when the selected datacenter is different from the datacenter at which the request was received. Upon determining that a cross-datacenter communication has occurred, the social networking system 302 can reevaluate 318 which placement configuration should be used to manage the portion of data. The reevaluation 318 can consider 320 count data 314. As one example, the social networking system 302 can determine that a new placement configuration should be selected for the portion of data. Once a new placement configuration is selected, the social networking system 302 can migrate 322 the portion of data to a set of datacenters associated with the new placement configuration. After the migration is complete, the social networking system 302 can associate 324 the new placement configuration with the portion of data.

Figure 4:
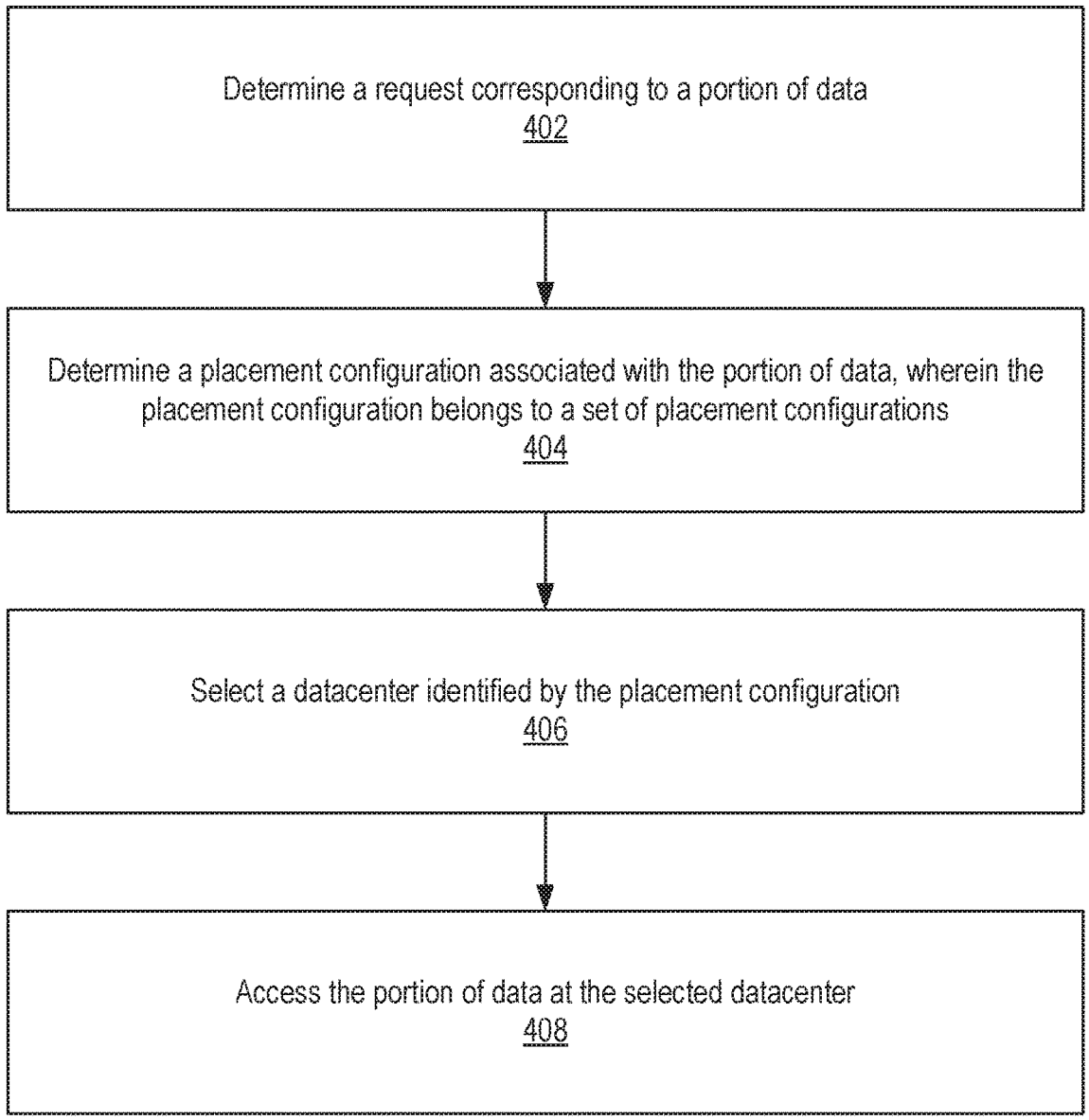
FIG. 4 illustrates an example process, according to an embodiment of the present disclosure.

FIG. 4 illustrates an example process 400, according to various embodiments of the present disclosure. It should be appreciated that there can be additional, fewer, or alternative steps performed in similar or alternative orders, or in parallel, within the scope of the various embodiments discussed herein unless otherwise stated.

At block 402, the example process 400 can determine a request corresponding to a portion of data. At block, 404 the process can determine a placement configuration associated with the portion of data, wherein the placement configuration belongs to a set of placement configurations. Then, at block 406, the process can select a datacenter identified by the placement configuration. Further, at block 408, the process can access the portion of data at the selected datacenter.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 5:
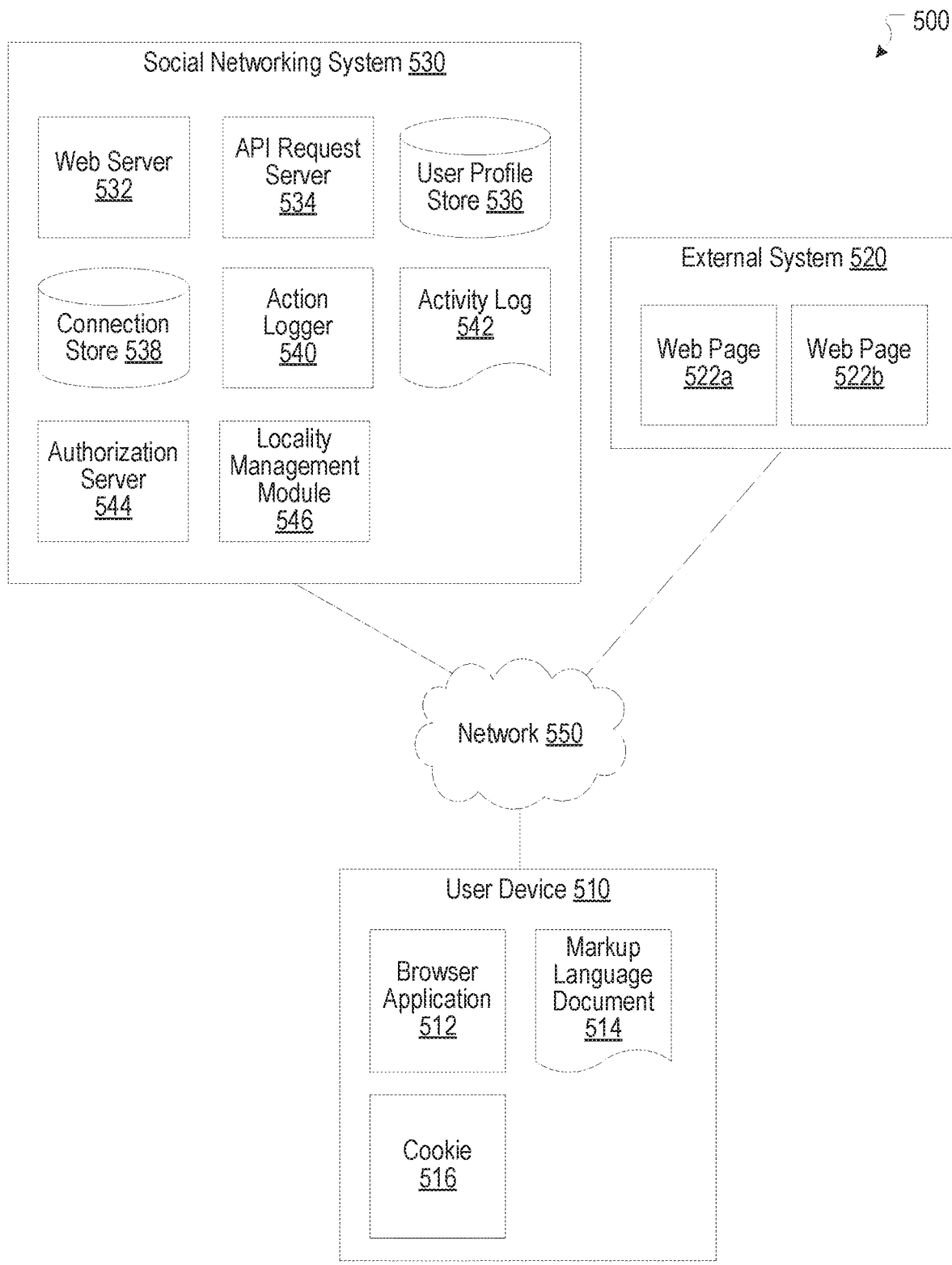
FIG. 5 illustrates a network diagram of an example system including an example social networking system that can be utilized in various scenarios, according to an embodiment of the present disclosure.

FIG. 5 illustrates a network diagram of an example system 500 that can be utilized in various scenarios, in accordance with an embodiment of the present disclosure. The system 500 includes one or more user devices 510, one or more external systems 520, a social networking system (or service) 530, and a network 550. In an embodiment, the social networking service, provider, and/or system discussed in connection with the embodiments described above may be implemented as the social networking system 530. For purposes of illustration, the embodiment of the system 500, shown by FIG. 5, includes a single external system 520 and a single user device 510. However, in other embodiments, the system 500 may include more user devices 510 and/or more external systems 520. In certain embodiments, the social networking system 530 is operated by a social network provider, whereas the external systems 520 are separate from the social networking system 530 in that they may be operated by different entities. In various embodiments, however, the social networking system 530 and the external systems 520 operate in conjunction to provide social networking services to users (or members) of the social networking system 530. In this sense, the social networking system 530 provides a platform or backbone, which other systems, such as external systems 520, may use to provide social networking services and functionalities to users across the Internet.

The user device 510 comprises one or more computing devices (or systems) that can receive input from a user and transmit and receive data via the network 550. In one embodiment, the user device 510 is a conventional computer system executing, for example, a Microsoft Windows compatible operating system (OS), macOS, and/or a Linux distribution. In another embodiment, the user device 510 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 510 is configured to communicate via the network 550. The user device 510 can execute an application, for example, a browser application that allows a user of the user device 510 to interact with the social networking system 530. In another embodiment, the user device 510 interacts with the social networking system 530 through an application programming interface (API) provided by the native operating system of the user device 510, such as iOS and ANDROID. The user device 510 is configured to communicate with the external system 520 and the social networking system 530 via the network 550, which may comprise any combination of local area and/or wide area networks, using wired and/or wireless communication systems.

In one embodiment, the network 550 uses standard communications technologies and protocols. Thus, the network 550 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 550 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 550 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 510 may display content from the external system 520 and/or from the social networking system 530 by processing a markup language document 514 received from the external system 520 and from the social networking system 530 using a browser application 512. The markup language document 514 identifies content and one or more instructions describing formatting or presentation of the content. By executing the instructions included in the markup language document 514, the browser application 512 displays the identified content using the format or presentation described by the markup language document 514. For example, the markup language document 514 includes instructions for generating and displaying a web page having multiple frames that include text and/or image data retrieved from the external system 520 and the social networking system 530. In various embodiments, the markup language document 514 comprises a data file including extensible markup language (XML) data, extensible hypertext markup language (XHTML) data, or other markup language data. Additionally, the markup language document 514 may include JavaScript Object Notation (JSON) data, JSON with padding (JSONP), and JavaScript data to facilitate data-interchange between the external system 520 and the user device 510. The browser application 512 on the user device 510 may use a JavaScript compiler to decode the markup language document 514.

The markup language document 514 may also include, or link to, applications or application frameworks such as FLASH™ or Unity™ applications, the Silverlight™ application framework, etc.

In one embodiment, the user device 510 also includes one or more cookies 516 including data indicating whether a user of the user device 510 is logged into the social networking system 530, which may enable modification of the data communicated from the social networking system 530 to the user device 510.

The external system 520 includes one or more web servers that include one or more web pages 522a, 522b, which are communicated to the user device 510 using the network 550. The external system 520 is separate from the social networking system 530. For example, the external system 520 is associated with a first domain, while the social networking system 530 is associated with a separate social networking domain. Web pages 522a, 522b, included in the external system 520, comprise markup language documents 514 identifying content and including instructions specifying formatting or presentation of the identified content. As discussed previously, it should be appreciated that there can be many variations or other possibilities.

The social networking system 530 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 530 may be administered, managed, or controlled by an operator. The operator of the social networking system 530 may be a human being, an automated application, or a series of applications for managing content, regulating policies, and collecting usage metrics within the social networking system 530. Any type of operator may be used.

Users may join the social networking system 530 and then add connections to any number of other users of the social networking system 530 to whom they desire to be connected. As used herein, the term "friend" refers to any other user of the social networking system 530 to whom a user has formed a connection, association, or relationship via the social networking system 530. For example, in an embodiment, if users in the social networking system 530 are represented as nodes in the social graph, the term "friend" can refer to an edge formed between and directly connecting two user nodes.

Connections may be added explicitly by a user or may be automatically created by the social networking system 530 based on common characteristics of the users (e.g., users who are alumni of the same educational institution). For example, a first user specifically selects an other user to be a friend. Connections in the social networking system 530 are usually in both directions, but need not be, so the terms "user" and "friend" depend on the frame of reference. Connections between users of the social networking system 530 are usually bilateral ("two-way"), or "mutual," but connections may also be unilateral, or "one-way." For example, if Bob and Joe are both users of the social networking system 530 and connected to each other, Bob and Joe are each other's connections. If, on the other hand, Bob wishes to connect to Joe to view data communicated to the social networking system 530 by Joe, but Joe does not wish to form a mutual connection, a unilateral connection may be established. The connection between users may be a direct connection; however, some embodiments of the social networking system 530 allow the connection to be indirect via one or more levels of connections or degrees of separation.

In addition to establishing and maintaining connections between users and allowing interactions between users, the social networking system 530 provides users with the ability to take actions on various types of items supported by the social networking system 530. These items may include groups or networks (i.e., social networks of people, entities, and concepts) to which users of the social networking system 530 may belong, events or calendar entries in which a user might be interested, computer-based applications that a user may use via the social networking system 530, transactions that allow users to buy or sell items via services provided by or through the social networking system 530, and interactions with advertisements that a user may perform on or off the social networking system 530. These are just a few examples of the items upon which a user may act on the social networking system 530, and many others are possible. A user may interact with anything that is capable of being represented in the social networking system 530 or in the external system 520, separate from the social networking system 530, or coupled to the social networking system 530 via the network 550.

The social networking system 530 is also capable of linking a variety of entities. For example, the social networking system 530 enables users to interact with each other as well as external systems 520 or other entities through an API, a web service, or other communication channels. The social networking system 530 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 530. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 530 modifies edges connecting the various nodes to reflect the relationships and interactions.

The social networking system 530 also includes user-generated content, which enhances a user's interactions with the social networking system 530. User-generated content may include anything a user can add, upload, send, or "post" to the social networking system 530. For example, a user communicates posts to the social networking system 530 from a user device 510. Posts may include data such as status updates or other textual data, location information, images such as photos, videos, links, music, or other similar data and/or media. Content may also be added to the social networking system 530 by a third party. Content "items" are represented as objects in the social networking system 530. In this way, users of the social networking system 530 are encouraged to communicate with each other by posting text and content items of various types of media through various communication channels. Such communication increases the interaction of users with each other and increases the frequency with which users interact with the social networking system 530.

The social networking system 530 includes a web server 532, an API request server 534, a user profile store 536, a connection store 538, an action logger 540, an activity log 542, and an authorization server 544. In an embodiment of the invention, the social networking system 530 may include additional, fewer, or different components for various applications. Other components, such as network interfaces, security mechanisms, load balancers, failover servers, management and network operations consoles, and the like are not shown so as to not obscure the details of the system.

The user profile store 536 maintains information about user accounts, including biographic, demographic, and other types of descriptive information, such as work experience, educational history, hobbies or preferences, location, and the like that has been declared by users or inferred by the social networking system 530. This information is stored in the user profile store 536 such that each user is uniquely identified. The social networking system 530 also stores data describing one or more connections between different users in the connection store 538. The connection information may indicate users who have similar or common work experience, group memberships, hobbies, or educational history. Additionally, the social networking system 530 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 530, such as non-person entities, buckets, cluster centers, images, interests, pages, external systems, concepts, and the like are also stored in the connection store 538.

The social networking system 530 maintains data about objects with which a user may interact. To maintain this data, the user profile store 536 and the connection store 538 store instances of the corresponding type of objects maintained by the social networking system 530. Each object type has information fields that are suitable for storing information appropriate to the type of object. For example, the user profile store 536 contains data structures with fields suitable for describing a user's account and information related to a user's account. When a new object of a particular type is created, the social networking system 530 initializes a new data structure of the corresponding type, assigns a unique object identifier to it, and begins to add data to the object as needed. This might occur, for example, when a user becomes a user of the social networking system 530, the social networking system 530 generates a new instance of a user profile in the user profile store 536, assigns a unique identifier to the user account, and begins to populate the fields of the user account with information provided by the user.

The connection store 538 includes data structures suitable for describing a user's connections to other users, connections to external systems 520 or connections to other entities. The connection store 538 may also associate a connection type with a user's connections, which may be used in conjunction with the user's privacy setting to regulate access to information about the user. In an embodiment of the invention, the user profile store 536 and the connection store 538 may be implemented as a federated database.

Data stored in the connection store 538, the user profile store 536, and the activity log 542 enables the social networking system 530 to generate the social graph that uses nodes to identify various objects and edges connecting nodes to identify relationships between different objects. For example, if a first user establishes a connection with a second user in the social networking system 530, user accounts of the first user and the second user from the user profile store 536 may act as nodes in the social graph. The connection between the first user and the second user stored by the connection store 538 is an edge between the nodes associated with the first user and the second user. Continuing this example, the second user may then send the first user a message within the social networking system 530. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 530 (or, alternatively, in an image maintained by another system outside of the social networking system 530). The image may itself be represented as a node in the social networking system 530. This tagging action may create edges between the first user and the second user as well as create an edge between each of the users and the image, which is also a node in the social graph. In yet another example, if a user confirms attending an event, the user and the event are nodes obtained from the user profile store 536, where the attendance of the event is an edge between the nodes that may be retrieved from the activity log 542. By generating and maintaining the social graph, the social networking system 530 includes data describing many different types of objects and the interactions and connections among those objects, providing a rich source of socially relevant information.

The web server 532 links the social networking system 530 to one or more user devices 510 and/or one or more external systems 520 via the network 550. The web server 532 serves web pages, as well as other web-related content, such as Java, JavaScript, Flash, XML, and so forth. The web server 532 may include a mail server or other messaging functionality for receiving and routing messages between the social networking system 530 and one or more user devices 510. The messages can be instant messages, queued messages (e.g., email), text and SMS messages, or any other suitable messaging format.

The API request server 534 allows one or more external systems 520 and user devices 510 to call access information from the social networking system 530 by calling one or more API functions. The API request server 534 may also allow external systems 520 to send information to the social networking system 530 by calling APIs. The external system 520, in one embodiment, sends an API request to the social networking system 530 via the network 550, and the API request server 534 receives the API request. The API request server 534 processes the request by calling an API associated with the API request to generate an appropriate response, which the API request server 534 communicates to the external system 520 via the network 550. For example, responsive to an API request, the API request server 534 collects data associated with a user, such as the user's connections that have logged into the external system 520, and communicates the collected data to the external system 520. In another embodiment, the user device 510 communicates with the social networking system 530 via APIs in the same manner as external systems 520.

The action logger 540 is capable of receiving communications from the web server 532 about user actions on and/or off the social networking system 530. The action logger 540 populates the activity log 542 with information about user actions, enabling the social networking system 530 to discover various actions taken by its users within the social networking system 530 and outside of the social networking system 530. Any action that a particular user takes with respect to another node on the social networking system 530 may be associated with each user's account, through information maintained in the activity log 542 or in a similar database or other data repository. Examples of actions taken by a user within the social networking system 530 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 530, the action is recorded in the activity log 542. In one embodiment, the social networking system 530 maintains the activity log 542 as a database of entries. When an action is taken within the social networking system 530, an entry for the action is added to the activity log 542. The activity log 542 may be referred to as an action log.

Additionally, user actions may be associated with concepts and actions that occur within an entity outside of the social networking system 530, such as an external system 520 that is separate from the social networking system 530. For example, the action logger 540 may receive data describing a user's interaction with an external system 520 from the web server 532. In this example, the external system 520 reports a user's interaction according to structured actions and objects in the social graph.

Other examples of actions where a user interacts with an external system 520 include a user expressing an interest in an external system 520 or another entity, a user posting a comment to the social networking system 530 that discusses an external system 520 or a web page 522a within the external system 520, a user posting to the social networking system 530 a Uniform Resource Locator (URL) or other identifier associated with an external system 520, a user attending an event associated with an external system 520, or any other action by a user that is related to an external system 520. Thus, the activity log 542 may include actions describing interactions between a user of the social networking system 530 and an external system 520 that is separate from the social networking system 530.

The authorization server 544 enforces one or more privacy settings of the users of the social networking system 530. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 520, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 520. One embodiment allows the specification of the set of entities to comprise an enumeration of entities. For example, the user may provide a list of external systems 520 that are allowed to access certain information. Another embodiment allows the specification to comprise a set of entities along with exceptions that are not allowed to access the information. For example, a user may allow all external systems 520 to access the user's work information, but specify a list of external systems 520 that are not allowed to access the work information. Certain embodiments call the list of exceptions that are not allowed to access certain information a "block list." External systems 520 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 544 contains logic to determine if certain information associated with a user can be accessed by a user's friends, external systems 520, and/or other applications and entities. The external system 520 may need authorization from the authorization server 544 to access the user's more private and sensitive information, such as the user's work phone number. Based on the user's privacy settings, the authorization server 544 determines if another user, the external system 520, an application, or another entity is allowed to access information associated with the user, including information about actions taken by the user.

In some embodiments, the social networking system 530 can include a locality management module 546. The locality management module 546 can, for example, be implemented as the locality management module 102 of FIG. 1. In some embodiments, some or all of the functionality of the locality management module 546 can be implemented in the user device 510.

Hardware Implementation

Figure 6:
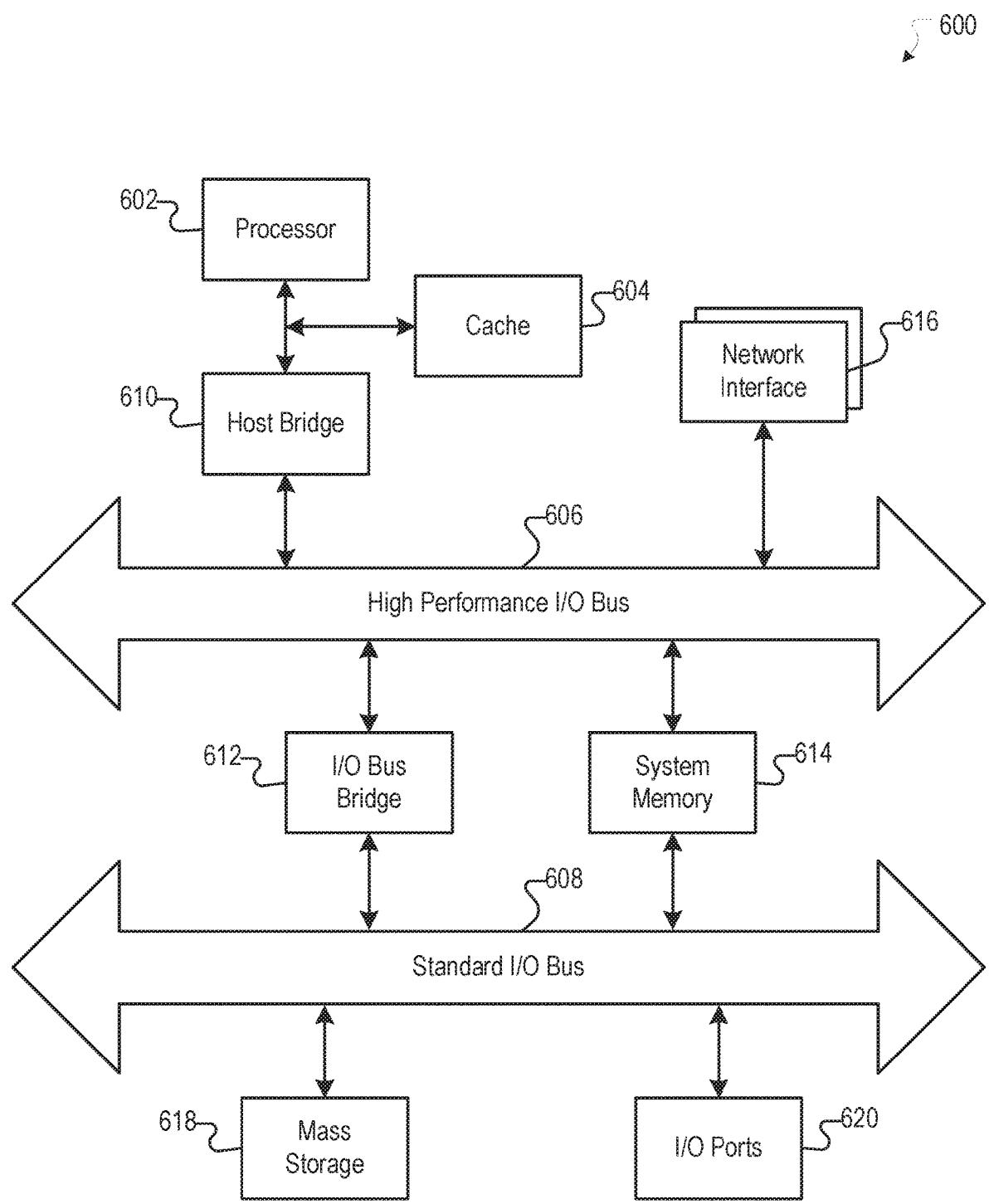
FIG. 6 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 6 illustrates an example of a computer system 600 that may be used to implement one or more of the embodiments described herein in accordance with an embodiment of the invention. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be the social networking system 530, the user device 510, and the external system 520, or a component thereof. In an embodiment of the invention, the computer system 600 may be one server among many that constitutes all or part of the social networking system 530.

The computer system 600 includes a processor 602, a cache 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to high performance I/O bus 606. The computer system 600 may further include video memory and a display device coupled to the video memory (not shown). Mass storage 618 and I/O ports 620 couple to the standard I/O bus 608. The computer system 600 may optionally include a keyboard and pointing device, a display device, or other input/output devices (not shown) coupled to the standard I/O bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module," with processor 602 being referred to as the "processor core." Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Moreover, the computer system 600 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 600 that, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614 and then accessed and executed by the processor 602. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a request to access a portion of data at a datacenter among geographically distributed datacenters;
   determining, by the computing system, a first placement configuration associated with the portion of data based on location data,
      wherein the first placement configuration specifies one or more first datacenters among which the portion of data is stored,
      wherein the first placement configuration belongs to a set of placement configurations;
   selecting, by the computing system, a datacenter from the one or more first datacenters;
   accessing, by the computing system, the portion of data at the selected datacenter;
   and
   in response to a determination that the selected datacenter is different from the datacenter at which the request is received,
      determining, by the computing system, a second placement configuration associated with the portion of data, wherein the second placement configuration specifies one or more second datacenters, and
      migrating, by the computing system, the portion of data to the one or more second datacenters.

2. The computer-implemented method of claim 1, further comprising:
   setting, by the computing system, the location data to indicate that the second placement configuration is associated with the portion of data.

3. The computer-implemented method of claim 1, wherein the determining the first placement configuration associated with the portion of data further comprises:
consulting, by the computing system, the location data.

4. The computer-implemented method of claim 1, further comprising:
logging, by the computing system, to count data, the accessing of the portion of data.

5. The computer-implemented method of claim 1, wherein the selected datacenter stores a primary instance of the portion of data, and wherein the accessing the portion of data comprises writing to the portion of data.

6. The computer-implemented method of claim 5, wherein the selected datacenter stores a secondary instance of the portion of data, and wherein the accessing the portion of data comprises reading from the portion of data.

7. The computer-implemented method of claim 1, further comprising:
changing, by the computing system, the set of placement configurations.

8. A system comprising:
at least one processor; and
a memory storing instructions that, when executed by the at least one processor, cause the system to perform:
receiving a request to access a portion of data at a datacenter among geographically distributed datacenters;
determining a first placement configuration associated with the portion of data based on location data,
wherein the first placement configuration specifies one or more first datacenters among which the portion of data is stored,
wherein the first placement configuration belongs to a set of placement configurations;
selecting a datacenter from the one or more first datacenters;
accessing the portion of data at the selected datacenter; and
in response to a determination that the selected datacenter is different from the datacenter at which the request is received,
determining a second placement configuration associated with the portion of data, wherein the second placement configuration specifies one or more second datacenters, and
migrating the portion of data to the one or more second datacenters.

9. The system of claim 8, wherein the determining the first placement configuration associated with the portion of data further comprises:
consulting the location data.

10. The system of claim 8, wherein the instructions, when executed by the at least one processor, further cause the system to perform:
logging, to count data, the accessing of the portion of data.

11. The system of claim 8, wherein the selected datacenter stores a primary instance of the portion of data, and wherein the accessing the portion of data comprises writing to the portion of data.

12. The system of claim 11, wherein the selected datacenter stores a secondary instance of the portion of data, and wherein the accessing the portion of data comprises reading from the portion of data.

13. The system of claim 8, further comprising:
changing, by the computing system, the set of placement configurations.

14. A non-transitory computer-readable storage medium including instructions that, when executed by at least one processor of a computing system, cause the computing system to perform a method comprising:
receiving a request to access a portion of data at a datacenter among geographically distributed datacenters;
determining a first placement configuration associated with the portion of data based on location data,
wherein the first placement configuration specifies one or more first datacenters among which the portion of data is stored,
wherein the first placement configuration belongs to a set of placement configurations;
selecting a datacenter from the one or more first datacenters;
accessing the portion of data at the selected datacenter; and
in response to a determination that the selected datacenter is different from the datacenter at which the request is received,
determining a second placement configuration associated with the portion of data, wherein the second placement configuration specifies one or more second datacenters, and
migrating the portion of data to the one or more second datacenters.

15. The non-transitory computer-readable storage medium of claim 14, wherein the determining the first placement configuration associated with the portion of data further comprises:
consulting the location data.

16. The non-transitory computer-readable storage medium of claim 14, wherein the instructions, when executed by the at least one processor of the computing system, further cause the computing system to perform:
logging, to count data, the accessing of the portion of data.

17. The non-transitory computer-readable storage medium of claim 14, wherein the selected datacenter stores a primary instance of the portion of data, and wherein the accessing the portion of data comprises writing to the portion of data.

18. The non-transitory computer-readable storage medium of claim 17, wherein the selected datacenter stores a secondary instance of the portion of data, and wherein the accessing the portion of data comprises reading from the portion of data.

19. The non-transitory computer-readable storage medium of claim 14, further comprising:
changing, by the computing system, the set of placement configurations.

* * * * *